March 12, 1940.  J. E. TRIGG  2,192,989
METHOD OF BEARING LUBRICATION
Filed May 14, 1938
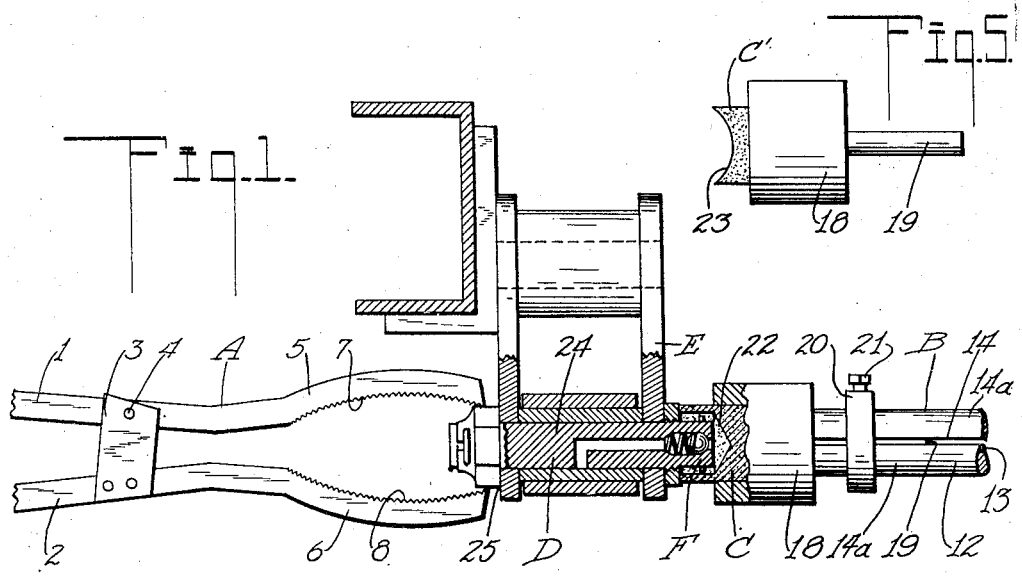
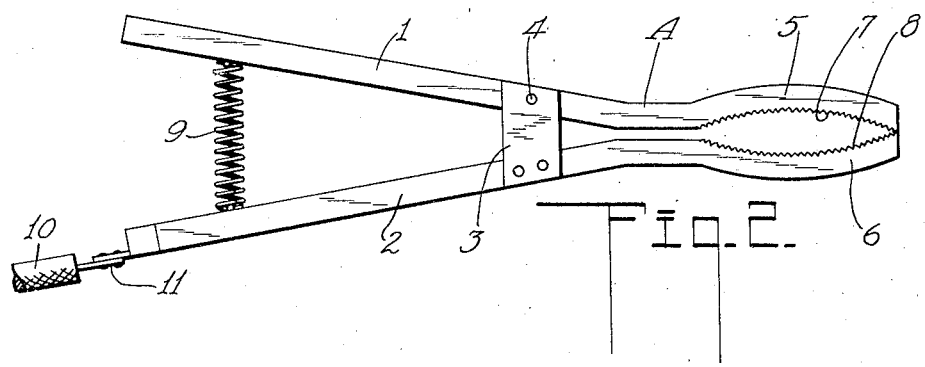
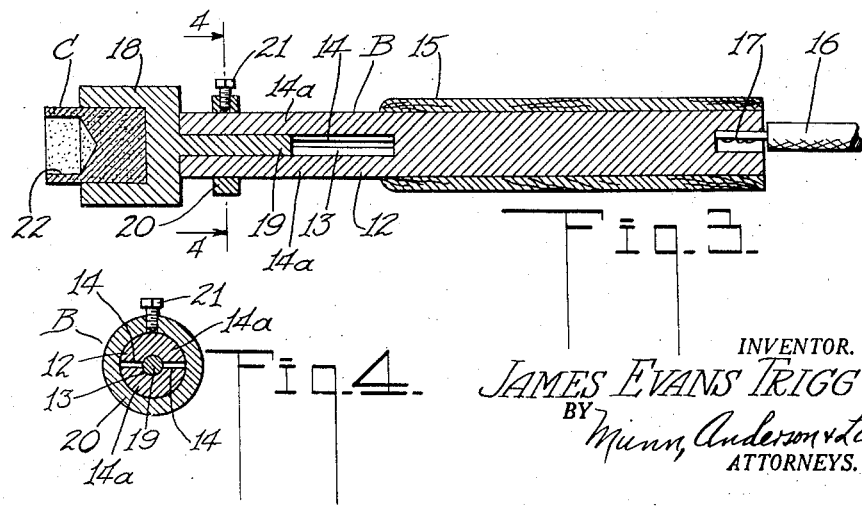
INVENTOR.
JAMES EVANS TRIGG
BY Munn, Anderson & Liddy
ATTORNEYS.

Patented Mar. 12, 1940

2,192,989

UNITED STATES PATENT OFFICE 2,192,989

METHOD OF BEARING LUBRICATION

James Evans Trigg, Sacramento, Calif.

Application May 14, 1938, Serial No. 207,990

3 Claims. (Cl. 184—1)

My invention relates to improvements in a method of bearing lubrication, and it consists of the combinations, constructions and arrangements hereinafter described and claimed.

The bearings in automobiles frequently become "frozen" which means that the grease in the bearing has solidified or that grit has mixed with the grease to a point where it cannot be forced out of the bearing by a grease gun forcing a new supply of grease into the bearing. Frequently, the flexible cable connecting a grease gun with a fitting will break under the enormous pressure built up in the cable in trying to force new grease into a "frozen" bearing.

Even under the most favorable circumstances, a bearing soon becomes partly clogged with foreign matter and solidified grease, and this may leave a small passage along the bearing surface through which a fresh supply of grease may be forced. The attendant in applying the grease gun, notes that grease is forced from the other end of the bearing and thinks that the entire bearing surface has been thoroughly lubricated when in fact, only a small part of the bearing surface has received fresh lubrication.

The principal object of my invention is to provide a method of bearing lubrication which will first loosen all grit and solidified grease from the bearing surfaces just prior to forcing new grease into the bearing. I accomplish this by heating the bearing to a point where the solidified grease will become softened and may be forced from the bearing by forcing new grease into the bearing. The attendant can determine whether the entire cylindrical surface of the bearing has been properly lubricated by noting whether the old grease is expelled from the entire periphery of the pin as the new grease is forced into the bearing. If this takes place, the attendant will know that the bearing has been properly lubricated throughout its entire surface.

I provide novel means for heating the bearing and this consists of an electrical conductor clamp designed to grip the bearing and a wire leading from the clamp to one terminal of a source of electric current. A second member of the mechanism is what I term a carbon holder and this member has a second wire connected with the other terminal of the source of current. When this second member is placed against the other end of the bearing to which the clamp has already been connected, an electric current will flow through the bearing of sufficient amperage and voltage to quickly heat the bearing and liquefy any grease in the bearing and loosen any grit. A grease gun is applied to the bearing fitting after the members are removed and new grease is forced into the bearing which will remove the old grease and foreign matter and perfectly lubricate the entire bearing surface.

Other objects and advantages will appear in the following specification, and the novel features of the device will be particularly pointed out in the appended claims.

My invention is illustrated in the accompanying drawing forming a part of this application, in which Figure 1 shows the device operatively applied to a spring shackle bearing, the bearing being shown in section;

Figure 2 is a side elevation of the clamp;

Figure 3 is a sectional view through the carbon holder;

Figure 4 is a section along the line 4—4 of Figure 3; and

Figure 5 shows a modified form of carbon that may be used in the carbon holder.

In carrying out my invention I provide a clamping member indicated at A in Figure 2. This clamp has two arms 1 and 2 and the arm 2 carries a bracket 3 on which the arm 1 is pivoted at 4. The arm 1 carries a jaw 5, while the arm 2 carries a jaw 6. In Figure 2 I have shown the jaws 5 and 6 arcuate in shape and provided with serrations 7 and 8 on their inner surfaces. A compression sprong 9 is connected to the arms 1 and 2 and tends to move the jaws 5 and 6 toward each other to grip an object therebetween.

An electric wire 10 is connected to the arm 2 at 11 and the arm 2 is made of metal so that it will conduct a current from the wire 10 to the jaw 6. When the jaws 5 and 6 engage with an object, the current in the wire 10 will be electrically connected to the object. I do not wish to be confined to the particular type of clamp shown because any type of electric connection between the wire 10 and the object to be heated, will suffice.

In Figure 3 I show a carbon holder B. The holder has a metal body 12 provided with a bore 13 extending part way into the body and radially disposed slits 14 extending from the bore to the outer surface of the body. An insulating handle 15 preferably made of wood, encloses a portion of the body 12. A wire 16 is electrically connected to the body 12 at 17. The wires 10 and 16 are connected with a source of current not shown.

A carbon indicated at C is removably secured to the body 12. The carbon is placed in a receptacle 18 which has an integral shank 19 that is removably received in the bore 13. A ring 20 is slipped over the body 12 and carries a set screw 21 that many be tightened for bringing the portions 14a defined by the slits 14, into frictional engagement with the shank. In this way, the carbon C is secured to the holder B.

The carbon C may be of any desired shape and in Figure 3, I have shown it provided with a recess 22. In Figure 5, I show a slightly modified form of carbon. The receptacle 18 and the shank 19 are identical in this form of the device and the carbon C' is provided with a groove 23 in place of the recess 22. In all other respects the two forms are the same.

From the foregoing description of the various parts of the device, the operation thereof may be readily understood.

In Figure 1, I show one type of bearing on which the device may be used. The bearing shown at D is for a spring shackle indicated at E. The clamp A grips one end of the bearing and the carbon holder B is manually held against the other end of the bearing. The carbon C receives an Alemite or other fitting F in the recess 22. The carbon holder B is purposely made in a manner not to be attachable to the bearing D. The current passed through the bearing is of sufficient strength to burn the bearing should it be connected to the bearing for too long a time. The carbon holder B is therefore made so that it must be disconnected from the bearing when the attendant has to leave. This will prevent the bearing from being burned out.

I have found that a current of approximately 350 to 400 amps. and about 30 volts is sufficient to heat the bearing in about fifteen seconds and to liquefy the grease and loosen any grit. As soon as this takes place, the clamp A and carbon holder B may be removed from the bearing.

A grease gun, not shown, is now applied to the fitting F and new grease is forced into the bearing. The new grease is forced into the bearing before the old grease has had a chance to again solidify. As the new grease is forced into the bearing, the old grease will be expelled. The attendant in checking the bearing, can determine whether the entire bearing surface has been lubricated by noting whether a film of grease issues from the bearing that entirely surrounds the entire periphery of the bolt 24. The old grease will be exuded at the crack 25 of the bearing or at some other point depending upon the construction of the bearing. When the carbon C' is used, it may be placed against the side wall of the bearing. The carbons may take other shapes if desired.

The invention in its broadest phase lies in the heating of a bearing by any means for softening the grease and loosening any foreign matter in the bearing. The heating of the bearing is continued until the old grease is soft enough to be moved by the new grease as it is forced into the bearing. The new grease is then forced into the bearing while the old grease still remains in a softened condition. The new grease will force all of the old grease and foreign matter from the bearing surfaces and will thoroughly lubricate all of these surfaces with fresh grease.

The clamp A is connected to the "ground" side of the electric circuit while the carbon holder B is connected to the "hot" side. The carbon C or C' permits the electric current to heat it when the carbon contacts with the bearing. It is the heated carbon and the flow of electricity through the bearing that heats the bearing to a point sufficient to soften the old grease in the bearing.

While I have shown only the preferred form of my invention, it should be understood that various changes or modifications may be made within the scope of the appended claims without departing from the spirit of the invention.

I claim:

1. The herein described method of lubricating a "frozen" bearing which consists in applying electrodes to the bearing, passing an electric current through the bearing by means of the electrodes for softening the grease in the bearing and for loosening any grit, and in forcing fresh grease into the bearing while the old grease is still in a softened condition, whereby the fresh grease will cover all parts of the bearing surfaces and will force the old grease and any grit from the bearing.

2. The herein described method of expelling all of the old grease and any foreign matter from a bearing and in providing all of the bearing surfaces with a fresh supply of grease which consists in passing a current of electricity through the bearing for heating it and softening the grease, and in forcing the quantity of new grease into the bearing while the old grease is still in a softened condition, whereby the new grease will force all of the old grease out of the bearing and will cover all of the bearing surfaces.

3. The herein described method of expelling all of the old grease and any foreign matter from a mechanical part and in supplying it with fresh grease which consists in applying electrodes to the mechanical part at distances from each other for causing the current that is to pass between the electrodes to flow through all of that portion of the mechanical part containing the grease, causing an electric current to pass through the electrodes and mechanical part for heating it and softening the grease and loosening any grit contained therein, and in forcing a quantity of new grease into the mechanical part under sufficient pressure to force out all of the old softened grease and any foreign matter and to substitute the new grease in its place.

JAMES EVANS TRIGG.